United States Patent Office 3,770,704
Patented Nov. 6, 1973

3,770,704
AROMATIC POLYAMIDES CONTAINING 4,4-DIAMINO-OXANILIDE MOIETIES
Frank Dobinson, Gulf Breeze, Fla., assignor to Monsanto Company, St. Louis, Mo.
No Drawing. Filed Mar. 24, 1972, Ser. No. 237,944
Int. Cl. C08g 20/20
U.S. Cl. 260—78 R                     6 Claims

ABSTRACT OF THE DISCLOSURE

A class of film- and fiber-forming, aromatic polyamides prepared by the condensation of substantially equimolar amounts of a diamine reactant comprising 4,4'-diamino-oxanilide and an aromatic diacid halide reactant. Fibers prepared from these polyamides are thermally stable and have a high modulus and are particularly suitable as reinforcing elements for rubber and plastic articles.

BACKGROUND OF THE INVENTION

Aromatic polyamides, their preparation and the preparation and the preparation of shaped articles therefrom, such as filaments, are generally known in the art. Exemplary patents relating thereto are: Kwolek U.S. 3,063,966; Morgan U.S. 3,414,645; and Kwolek U.S. 3,600,350.

An object of the present invention is to provide a new class of film- and fiber-forming, aromatic polyamides and thermally stable, high-modulus fibers prepared therefrom.

SUMMARY OF THE INVENTION

The present invention provides a class of film- and fiber-forming, aromatic polyamides consisting essentially of repeating units of the formula

wherein each Aq is an amine-free radical in diamino-oxanilide, i.e.,

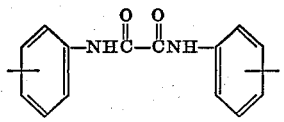

and each Ar is a divalent carbocyclic aromatic radical, the chain-extending covalent bonds of which are oriented meta or para to one another, with a proviso that at least 90 mole percent of the Aq radicals are

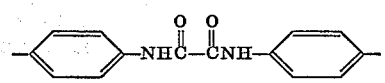

The polyamides of this invention may be prepared and processed into fibers according to techniques described in the foregoing mentioned patents. As described in these patents, aromatic polyamides are prepared by solution and/or interfacial polymerization techniques and fibers thereof are generally prepared by either dry spinning or wet spinning techniques. Preferably, the fibers are prepared by wet spinning techniques in which a solution of the polyamide (dope) is extruded into a suitable coagulation bath to form filaments that are subsequently washed, processed and packaged.

The polyamides of the present invention and spinning solutions thereof (i.e., dopes) ares conveniently prepared by the so-called "coupled" process as described in U.S. Pats. 3,600,350 and 3,414,645. The resulting dopes are then utilized for the preparation of films, filaments, fibrids and coatings.

In a typical preparation of a dope containing the polyamides of the present invention, a diamine reactant consisting essentially of diamino-oxanilide in which at least 90 mole percent thereof is 4,4'-diamino-oxanilide is added with stirring to a solvent consisting essentially of a 1–10% by weight solution of lithium chloride in either N,N-dimethylacetamide or a mixture of N,N-dimethylacetamide and hexamethylphosphoramide. The resulting slurry is cooled to about 0° C. Then there is added to the slurry, based on the amount of diamine reactant present, a substantially equimolar amount of a diacid halide reactant in which the component or components thereof are of the formula

wherein Ar has the same meaning as previously defined and X is a chloride or bromide ion. The mixture is stirred further to obtain a clear, viscous dope (polyamide solution). Vigorous or high-speed stirring of the polymerization mixture may be required to attain a clear dope due to the solubility characteristics of aromatic polyamides in which the divalent aromatic radicals are para oriented to one another.

Diacid halides which are particularly preferred for use in preparing the polyamides of the present invention are the diacid chlorides of the formula

in which —AR— is a divalent aromatic radical as previously defined. Ar may be a single, multiple or fused ring divalent radical. Representative Ar radicals include

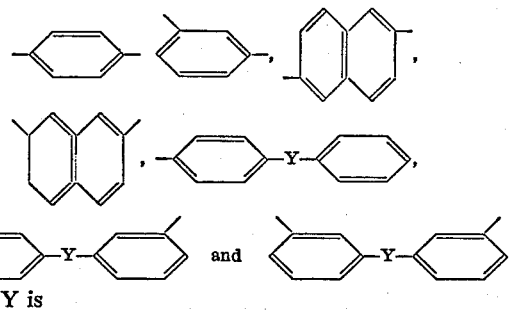

where Y is

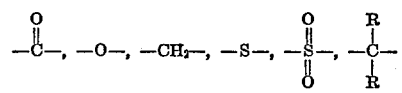

(R is a $C_1$ to $C_4$ alkyl) or a covalent bond in which case Ar is, for example,

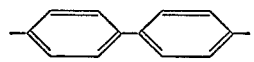

Best fiber properties are attained from polymers prepared from a diacid chloride reactant in which a high percentage of the Ar radicals thereof have para oriented covalent bonds, such as

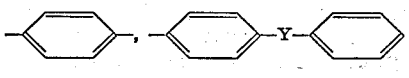

or

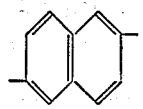

A particularly preferred diacid chloride reactant for use in preparing the polyamides of the present invention is terephthaloyl chloride or a mixture of terephthaloyl chloride and isophthaloyl chloride containing 50% or more terephthaloyl chloride, since these compounds are relatively inexpensive and easily prepared.

Preferably the diamine reactant used in preparing the polyamides of this invention consists of 4,4'-diamino-oxanilide. However, the diamine reactant may contain up to 10 mole percent of other diamino-oxanilides, e.g. 2,4'-, 2,3'-, 2,2'-, 3,3'-, or 3,4'-diamino-oxanilide or a mixture thereof.

Spinning solutions of the polyamides described herein may be used to prepare fibers according to conventional wet spinning techniques, such as the dry jet-wet spinning technique described in U.S. Pat. 3,414,645.

PREFERRED EMBODIMENTS OF THE INVENTION

The following examples illustrate the preferred embodiments of the invention. Unless otherwise specified, percentages give in the examples are weight percentages.

Example 1.—Preparation of 4,4'-diamino-oxanilide

Oxalyl chloride (100 g.) was slowly added, chilled, to ice-cooled tetrahydrofuran (400 ml.). The resulting orange solution was added dropwise with stirring over a period of 45 minutes to a solution of p-nitroaniline (228 g., 2.1 molar equivalents) in 1.5 liters of N,N-dimethylacetamide (i.e. DMAc), cooled in an ice-bath. The ice-bath was removed, and stirring was continued for one hour. The yellow solid product

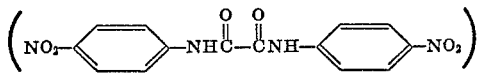

was removed from the reaction products by filtration and washed with hot N,N-dimethylformamide (600 ml. at 100° C.). The resulting slurry was filtered, and the recovered solid washed with ethanol.

The above-specified dinitro compound was reduced in a conventional manner to form the corresponding diamine. This was accomplished by slurrying the solid defined in the preceding paragraph with ethanol (750 ml.), concentrated hydrochloric acid (750 ml.) and stannous chloride (675 g.) in a 5-liter flask. The slurry was refluxed for 4 hours and then cooled by addition of further ethanol (200 ml.). The resulting product, the dihydrochloride of the desired diamine, was filtered off and slurried with water. Dilute sodium hydroxide solution (5% aqueous) was slowly added to the slurry until the pH reached 10. The diamine, 4,4'-diamino-oxanilide, was filtered off, slurried with water and filtered twice, and dried at 100° C. in vacuo.

3,3'-diamino-oxanilide can be prepared by the foregoing procedure by using m-nitroaniline in place of p-nitroaniline or a mixture of 3,3'-, 3,4'- and 4,4'-diamino-oxanilide can be prepared by using a mixture of m- and p-nitroaniline. Each of the diamino-oxanilide isomers may be separated from the prepared mixture. Preferably, however, sufficient p-nitroaniline is used in preparing the mixture of diamino-oxanilide isomers to provide a mixture containing at least 90 mole percent of the para isomer. In this latter instance the mixture may be used directly as the diamine reactant in preparing the polyamides of this invention. Diamino-oxanilide may also be prepared from oxanilide by nitration and reduction of the resultant dinitro-oxanilide to a diamine. The diamine product may be subsequently purified to obtain pure 4,4'-diamino-oxanilide or a mixture of diamines that contains 90 mole percent or more of 4,4'-diamino-oxanilide.

Example 2

4,4'-diamino-oxanilide (2.7 g. or 0.01 mole), prepared as in Example 1, was stirred with 25 ml. of a dry 5% solution of lithium chloride in DMAc (DMAc/LiCl), in a small conical flask fitted with a stirrer and swept with dry nitrogen. The slurry was cooled to 0° C., by means of an ice-bath, and isophthaloyl chloride (2.03 g. or 0.01 mole) was added. An additional 25 ml. of DMAc/LiCl was used to wash in the acid chloride. The ice-bath was removed after 15 minutes and stirring was continued for another hour, after which time, a clear, viscous polymer solution (dope) formed.

A portion of the solid polymeric material having the repeating unit

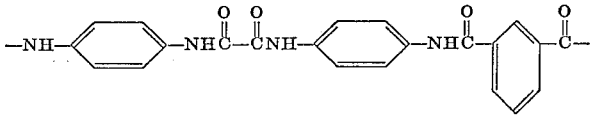

was isolated by adding water to the dope. The inherent viscosity ($\eta_{inh.}$) of the polymer was measured at 25° C. on 0.5% polymer solution in DMAc/LiCl and found to be 0.6. The polymer melt temperature (PMT), as determined by differential thermal analysis (DTA), was 450° C.

Example 3

The procedure of Example 2 was repeated with the exception that, in place of using 0.01 mole of isophthaloyl chloride, a mixture of 0.005 mole of isophthaloyl chloride and 0.005 mole of terephthaloyl chloride was used. The acid of the resulting polymer solution was neutralized by stirring in 0.8 g. of lithium hydroxide (0.02 mole). The polymer was isolated and analyzed, as in Example 2. The $\eta_{inh.}$ thereof was 0.7 and the PMT was 430° C. The polymer had repeating units (A) 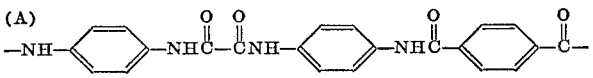

and (B) 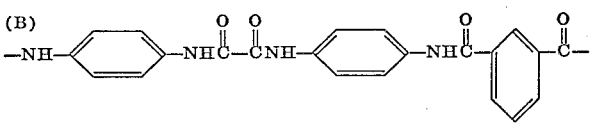

wherein the mole ratio of units (A) to units (B) was 1:1.

Example 4

4,4'-diamino-oxanilide (5.6 g. or 0.0208 mole), prepared as in Example 1, was slurried with a mixture of 140 ml. dry hexamethylphosphoramide and 70 ml. of DMAc containing 5% lithium chloride in a 500-ml. resin kettle fitted with a ground-glass lid having two ports. One port permitted circulation of dry nitrogen above the reacting materials and the other port housed a double-helix stirrer having blades 0.5 inch across and spaced less than 0.125 inch from the kettle wall. The resulting slurry was stirred with great rapidity (500–700 r.p.m.) and 4.06 grams terephthaloyl chloride (0.200 mole) was added all at once. The reaction solution, as it was stirred at about 500 r.p.m., became viscous and clear. The stirrer was slowed to about 50 r.p.m. after about 30 minutes. After an additional 20 minutes stirring, about 8 g. of dry lithium chloride was added making the solution about 5% in lithium chloride.

A portion of the resulting dope was diluted to 0.5% concentration of polymer and the $\eta_{inh.}$ was measured, as in Example 2, and found to be 3.1. The polymer consisted of repeating units of the structure:

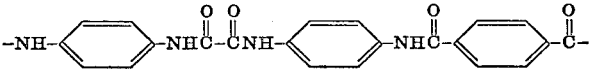

The remainder of the dope was placed in a hollow, stainless-steel spinning vessel and dry jet-wet spun through a 5-hole, 6 mil spinneret into an aqueous spin-bath, using a half-inch air gap. Clear, well-collapsed filaments were wound up on a pair of rollers (godets) immersed in a wash bath of DMAc/water (25% DMAc), at a rate such that the theoretical jet-stretch of the filaments was 1.0. The washed filaments then passed over a second pair of rollers to give a "cascade stretch" of 1.1. After washing, the bright yellow fiber was dried on steam-heated godets. The fiber had a tenacity of 3.0 grams per denier (g.p.d.), an elongation at break of 7% and an initial modulus of 132 g.p.d.

The tensile property values (e.g. tenacity and modulus) recited in the examples for the fibers illustrated therein can be substantially increased by conventional techniques. For example, fibers having a tenacity of at least 10 g.p.d. and an initial modulus of at least 250 g.p.d. can be obtained by further stretching, annealing and/or other secondary heat-treatments of the fibers and/or by modification of spinning conditions recited in the examples.

Other preferred diacid chloride reactants which may be reacted with 4,4'-diamino-oxanilide as in Examples 3 and 4 to prepare the polyamides and fibers thereof of this invention include:

(1)

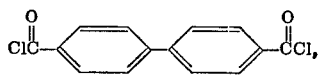

(2)

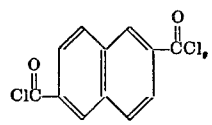

(3)

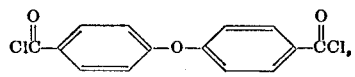

(4)

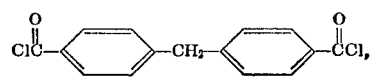

(5) mixtures thereof, or
(6) any one or more of these diacid chlorides in combination with terephthaloyl chloride and/or isophthaloyl chloride.

The foregoing examples illustrate specific embodiments of the invention. It will be apparent to those skilled in the art that the preparation of spinning dopes containing the polyamides of this invention may be carried out utilizing solvents other than those specifically described, e.g., tetramethylurea, hexamethylphosphorictriamide, N-methyl pyrollidone, or mixtures of solvents, all of which contain dissolved LiCl or an equivalent salt, such as CaCl$_2$, SrCl$_2$, etc. Also, the polymer may be precipitated from the polymerization solvent and redissolved in concentrated sulfuric acid to provide spinning dopes from which fibers of the polyamides of the present invention may be prepared.

Further, the diamine reactant used in preparing the polyamides of the present invention may contain, in addition to the diamine components described herein, minor amounts (less than 10 mole percent) of other aromatic diamine components, such as benzidine or other diamino-oxanilide isomers.

What is claimed is:
1. A film- and fiber-forming linear, aromatic polyamide consisting essentially of repeating units of the formula

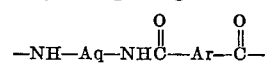

wherein each Aq is the amine-free radical in diamino-oxanilide and each Ar is a divalent carbocyclic aromatic radical in which the chain-extending bonds thereof are oriented meta or para to one another, with the proviso that at least 90 mole percent of the Aq radicals in the polymer chain are

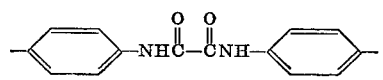

radicals.

2. The polyamide of claim 1, wherein Aq is

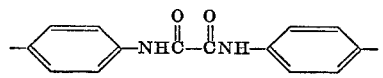

3. The polyamide of claim 2, wherein Ar is selected from the group consisting of

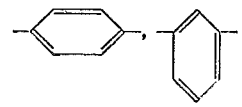

and mixtures thereof.

4. The polyamide of claim 3, wherein Ar is

5. A fiber of the polymer of claim 1.
6. A fiber of the polymer of claim 3.

References Cited
UNITED STATES PATENTS

| | | | |
|---|---|---|---|
| 3,094,511 | 6/1963 | Hill et al. | 260—78 R |
| 3,354,125 | 11/1967 | Smith et al. | 260—78 R |
| 3,442,869 | 5/1969 | Wolfes et al. | 260—78 R |
| 3,471,444 | 10/1969 | Sherer et al. | 260—47 CP |
| 3,551,385 | 12/1970 | Bach | 260—78 R |

HAROLD D. ANDERSON, Primary Examiner

U.S. Cl. XR.

260—30.2, 30.6 R, 30.8 R, 32.6 N, 47 CZ, 65, 562 N; 264—176 F